United States Patent [19]

Gottlieb

[11] Patent Number: 5,513,752
[45] Date of Patent: * May 7, 1996

[54] FLIPTOP PACKAGE FOR CASSETTE TAPE

[76] Inventor: Steven Gottlieb, 220 Central Park S. Apt. 2B, New York, N.Y. 10019

[*] Notice: The portion of the term of this patent subsequent to Nov. 8, 2011, has been disclaimed.

[21] Appl. No.: 334,862

[22] Filed: Nov. 4, 1994

Related U.S. Application Data

[62] Division of Ser. No. 183,297, Jan. 18, 1994, Pat. No. 5,361,898, which is a continuation of Ser. No. 934,356, Aug. 24, 1992.

[51] Int. Cl.$^6$ .................... B65D 85/30; B65D 85/672; B65D 69/00
[52] U.S. Cl. .................. 206/387.1; 206/232; 229/120.18
[58] Field of Search .............................. 206/308.1, 387.1, 206/387.12, 387.13, 232, 45.14; 229/120.08, 120.11, 120.18, 160.1

[56] References Cited

U.S. PATENT DOCUMENTS

| | | |
|---|---|---|
| 2,480,416 | 11/1945 | Modes . |
| 2,580,141 | 12/1951 | Vidal . |
| 2,827,223 | 3/1958 | Allison . |
| 2,881,913 | 4/1959 | Kursh . |
| 2,965,278 | 12/1960 | Philips . |
| 3,077,263 | 2/1963 | Froehlig . |
| 3,279,594 | 10/1966 | Worthington . |
| 3,302,844 | 2/1967 | Henry . |
| 3,337,119 | 8/1967 | Bowers et al. . |
| 3,404,830 | 10/1968 | Rand . |
| 3,516,698 | 6/1970 | Martins . |
| 3,594,976 | 7/1971 | Jackson . |
| 3,656,612 | 4/1972 | Sellors . |
| 3,675,763 | 7/1972 | Sandel . |
| 3,682,297 | 8/1972 | Austin et al. . |
| 3,829,132 | 8/1974 | Willieme . |
| 3,874,581 | 4/1975 | Fox et al. . |
| 4,042,106 | 8/1977 | Smith . |
| 4,134,495 | 1/1979 | Friedman . |
| 4,251,022 | 2/1981 | Focke . |
| 4,307,806 | 12/1981 | Haubert . |
| 4,325,507 | 4/1982 | Janhonen . |
| 4,339,034 | 7/1982 | Panveno . |
| 4,349,107 | 9/1982 | Pritchard . |
| 4,365,708 | 12/1982 | Tyus . |
| 4,429,826 | 2/1984 | Shedd . |
| 4,453,631 | 6/1984 | Mark . |
| 4,457,428 | 7/1984 | Saito . |
| 4,473,153 | 9/1984 | Colangelo . |
| 4,640,413 | 2/1987 | Kaplan et al. . |
| 4,653,639 | 3/1987 | Traynor . |
| 4,674,632 | 6/1987 | Friedman . |
| 4,828,105 | 5/1989 | Silengo et al. . |
| 4,850,731 | 7/1989 | Youngs . |
| 4,852,740 | 8/1989 | Sellar et al. . |
| 4,863,032 | 9/1989 | Bothe et al. . |
| 4,905,217 | 2/1990 | King et al. . |
| 4,905,831 | 3/1990 | Bagdis et al. . |
| 5,022,522 | 6/1991 | Kennedy . |
| 5,048,681 | 9/1991 | Henkel . |
| 5,096,064 | 3/1992 | Rufo, Sr. . |
| 5,101,973 | 4/1992 | Martine . |
| 5,103,972 | 4/1992 | Ackeret . |
| 5,147,036 | 9/1992 | Jacobs . |
| 5,219,090 | 6/1993 | Vollmann ..................... 206/387.12 X |

FOREIGN PATENT DOCUMENTS 3013879  10/1981  Germany ..................... 206/387.13

*Primary Examiner*—Bryon P. Gehman
*Attorney, Agent, or Firm*—Levisohn, Lerner, Berger & Langsam

[57] ABSTRACT

A package for an audio cassette tape and a booklet of lyrics. The container has a flip-top and, in the preferred embodiment, two separate compartments for the tape and the booklet. The carton is preferably made from a single sheet of card stock. Spacing legs projecting from the dividing panel ensure that the front panel is separated from the booklet-backing or dividing panel and provides a support or compartment for the booklet.

7 Claims, 3 Drawing Sheets

FLIPTOP PACKAGE FOR CASSETTE TAPE

This application is a division of application Ser. No. 08/183,297, filed Jan. 18, 1994, now U.S. Pat. No. 5,361,898, which is a continuation of application Ser. No. 07/938,356 filed Aug. 24, 1992.

BACKGROUND OF THE INVENTION

The present invention relates to a package for audio and/or visual recorded materials, preferably audio cassette tapes. The package is inexpensive to manufacture, highly aesthetic, functional and environmentally sound. The package is preferably made from coated card-stock material and is not much bigger than the cassette tape intended to be stored therein.

The package of the present invention can be utilized with current Norelco-type standard size audio cassette tapes, or, alternatively, it can be easily adapted for microcassette tapes, compact discs, mini discs, digital audio tapes or even video cassette tapes. Of course, if any other visual or sound recording format or embodiment becomes commercially significant, the package can be similarly adapted and configured for use, without departing from the present invention. For illustrative purposes, however, the present invention will be described with respect to a standard size audio cassette tape, i.e., the tape format currently manufactured by the N. V. Philips Company of the Netherlands under the Norelco trademark and tradename. Its size and dimensions, therefore, are specifically incorporated herein and believed well-known to those of skill in the art. The embodiment of the present invention in terms of size and dimension will basically correspond thereto. The term audio cassette shall include all formats identified above.

Basically, the present invention provides an outer protective carton or package for the cassette tape. This enables the tape to be stored for initial sale and in between actual uses. When the user desires to insert the cassette tape into a playback or tapedeck machine, the cassette tape can easily be removed from the package. After use, the tape is stored back in the package. In addition, the package includes a convenient and physically separate compartment for the selective inclusion, by the seller of the cassette tape, of a booklet containing liner notes or lyrics of the cassette tape or other printed materials.

In its preferred embodiment, the package is made from a paper-like card stock material which is more environmentally sound than the current plastic containers, sold as packages for cassette tapes. The present invention is preferably embodied in a package which is barely larger than the size of the audio cassette tape, and this also increases the aesthetic attractiveness of the container with respect to prior art point of purchase packages for cassette tapes which are, generally, far larger than the cassette tape.

DESCRIPTION OF THE PRIOR ART

Audio cassette tapes of the Norelco standard size are primarily packaged, today, in hard plastic containers having a hinge to allow selective access. This Norelco type hard plastic container can break, develop cracks, nay splinter, shatter and often snaps apart. The sharp edges make the Norelco hard plastic package uncomfortable when placed in shirt or pants pockets, in backpacks, on carseats or anywhere in close proximity to a person. Furthermore, the hard plastic packages are relatively cumbersome and unwieldy, can rattle and clack noisily during automobile traveling.

Significantly, from a cost effectiveness standpoint, the audio cassette tapes when packaged in the Norelco hard plastic containers are heavy. The hard plastic casing almost doubles the weight of carrying a cassette tape. That, of course, is a disadvantage to the consumer in carrying a large number of cassettes but of more economic significance, the increased weight is an increased cost for shipping.

Current plastic containers often contain fold-out paper inserts (J-cards) which carry various indicia of information as, for example, the title of the work, the artist, the publisher, and, on occasion, the lyrics. These fold-out inserts are relatively difficult to read (they employ very small size type) are graphically unappealing, are easily separated and lost from the package and/or are as complex as a road map to refold and reinsert into the package. Current inserts are relatively prone to disassembly at the folds/perforations, due to repeated handling.

Another disadvantage of the Norelco hard plastic package for audio cassette tapes is, as mentioned, the fact that the package is unnecessarily heavy relative to the product and that, therefore, makes for expensive freight. In addition, internal distribution of cassette tapes, relocation and return processing for the manufacturer are further complicated by the relatively heavy hard plastic package.

Of increasing current significance is the fact that the hard plastic package is environmentally unsound in that the plastic does not decay over time. Therefore, present packages pose a serious environmental hazard since the plastic packages break easily and are merely discarded.

The hard plastic cassette package has little appeal to consumers making low-price counterfeits of the tape; a "smart" purchase decision since the consumer currently has no desire for an original package, only for a tape. Since inexpensive recording hardware can easily duplicate prerecorded cassettes and since the current hard plastic cassette packaging has little appeal to consumers, the lower-price counterfeits are an obvious choice for many. Accordingly, a cassette package which has actual "appeal" to the consumer could be one prong in an attack seeking to eliminate low-price counterfeiting. Color photocopying or inexpensive printing can accurately duplicate the "J-card" insert which is normally associated with the current hard plastic cassette packaging. That, it seems, is no obstacle to a counterfeiter. If the carton itself were printed with colorful graphics, would-be counterfeiters would have a more difficult time of passing-off the counterfeits as the original and genuine article since they are unlikely to invest the time and effort needed to produce color separation copies of the original packaging. The present invention can have graphic material printed directly on it.

The existence of plentiful and relatively inexpensive Norelco hard plastic packages simultaneously masks the inferiority of the insert's printed graphics and also conveys the legitimacy of the original product. Indeed, the Norelco hard plastic package is, substantially the only component of a counterfeit cassette tape which precisely duplicates the quality of the original cassette tape. Thus, utilization of a new package which carries graphics may help to reduce counterfeiting and the appeal counterfeits have to the ordinary consumer. So long as cassette packaging is of little appeal to the ultimate consumer, a high-quality home tape of a work for the mere cost of a blank cassette tape will be appealing.

Thus, one effort at reducing counterfeiting is by developing a cassette package which provides greater benefit to the consumer. If the package adds some value to that received by the consumer, then consumers may not so easily accept counterfeits as low-cost substitutes. Furthermore, the growth of home taping and counterfeits, even at the expense of some loss of audio quality, must be reconciled with a seemingly contrary principle that consumers gain, benefit and will pay for high-fidelity improvements brought to the market by digital audio cassettes and mini-discs. Instead of attempting to rival the compact discs' inherent audio benefits, namely of better fidelity, cassette tapes, if packaged in unique, attractive, inexpensive and environmentally sound containers, can establish their own market niche.

The present invention, therefore, is a paperboard box-like container for an audio cassette tape. It offers many benefits to retailers, manufacturers and consumers. For example, the paperboard box may be fully recyclable. A box made consistent with the present invention would be about 30% lighter in weight than conventional hard plastic cassette tape packages. This reduces shipping cost by about 25% and the estimated freight savings per million units shipped is approximately $11,000 to the distributor, with similar savings to the chain retailer.

The paperboard box would also occupy about 24% less warehouse volume. This increases the turnover of inventory per square foot. It also allows for a greater ratio of retail area to storage space. Decreasing the overhead in manufacturing and distribution centers will also result from a smaller and less heavy package. The paperboard box-like container also would be far more space efficient so as to foster the display by the retailers of more stock and titles to increase sales.

The package allows for graphics to be directly printed on the box, itself, even including printing on short-ends. This allows for more efficient display of more titles and artists on the same shelf space.

The paperboard box-like container requires either new packing machines or large-scale manual labor operations. While this is a negative to the manufacturer, it will serve to reduce counterfeits since the cost of entry may be beyond the financial resources of the counterfeiter especially where demand for counterfeits may drop due to more desire for the original. Counterfeit tapes and packages, once able to inexpensively mask the inferior graphics and audio of a tape, would now appear much more obvious to the consumer and cheap, since less expensive and visually obvious counterfeits of inferior quality can well be more easily discerned. The increased costs, new inventory requirements, law enforcement risks, and competition for consumer preference will make counterfeiting less appealing.

Another benefit to consumers is the fact that the box containing the cassette tape would be lighter and easier to carry around. The container could be visually more attractive, with graphics and important indicia of information possibly printed on all sides. The box would invite creativity and challenges to artists so that the package itself may become as elite as the music of the artist contained on the cassette tape itself.

The box-like container of the present invention is intended to also contain an attractive booklet of lyrics and/or other written or printed information relating to the artist or the work, itself. This provides an opportunity for further marketing and for providing additional information to the consumer. The paperboard box could also have the listing of the tracks of the audio cassette tape legible on the outside of the package unlike the small-size type currently used on cassette tape inserts which are difficult to read. Furthermore, the paperboard box-like container would be highly "user friendly." It would be smooth to the touch, it would have a positive tactile feel and it would be easy to handle. It would be crushable at its corners, but easily uncrushed. The package, itself, would "wear in" similar to the user-friendly feeling that many have for their old long-playing records and associated album covers. The package would allow the tape to be easily accessible and is easy to open. Furthermore, since the package resembles a flip-top cigarette package, it would be readily recognizable to a large segment of the marketplace and would be easy to open and close. This is different from the current hard plastic package which is difficult to open for a fairly large segment of the population.

U.S. Pat. No. 3,829,132 relates to a composite cover-support for audio cassettes and books. As can be best understood by a review of the drawings and specification thereof, a composite cover-support for a cassette tape is provided which includes a separate compartment for holding written materials. However, as understood by FIG. 1 of the drawings of the '132 patent, the device is necessarily larger in overall dimension than the cassette tape itself. In patentable contrast, however, the present invention provides a storage device for a cassette tape which is substantially the same dimensions as the cassette tape. According to the specific teaching of the '132 patent, when the cover-support for a tape cassette and book is assembled by folding one side upon itself, the cassette and the book will lie adjacent to one another, occupying the space between the cover members, with the cassette being held in position within the cover assembly by an edge of the book or by an edge of the compartment for holding the book. Again, it will be appreciated, therefore, that the cover-support for the tape cassette and the book of the '132 patent provides a package which is substantially larger in overall dimension than the cassette tape, itself. In contrast, however, the present invention provides a package for the cassette tape which is only slightly larger in dimension than the cassette tape. The booklet to be contained within the package of the present invention only adds slightly to the smallest dimension of the cassette tape, the thickness. This allows the package to be small, compact and convenient and, yet, a booklet is provided along with the cassette tape, all in a convenient package.

U.S. Pat. No. 3,675,763 shows a carton for holding and displaying cassette tape cartridges in a manner that permits unrestricted browsing while resisting theft. The cartons are wide enough so that they can be easily inserted into a man's vest pocket and, yet, too long for concealment under one's arms. Thus, use of the container allows the printed information of the insert for the plastic cassette carrier to be viewed by a potential consumer and, yet, minimizes pilferage and shoplifting due to the container's size. The container is provided, when assembled, with "retainers" which position the cassette cartridge within the carton at the upper end of the carton and in alignment with display openings so that the cassette tape and the printed material is easily viewed. It is a specific aspect of the device of the '763 patent that the side retainers for the carton are formed laterally within the carton, thereby allowing a carton to be used which is far wider and/or longer than the cartridges themselves. In patentable contrast, however, the present invention contemplates a reusable cassette package which is substantially equal to the overall dimensions of the cassette tapes sought to be contained therein. The carton of the '763 patent is intended to be discarded immediately after purchase. That carton really does not provide a storage package for the cassette tape after purchase. The present invention is intended to provide a carton for shipping and display purposes and, in addition, even after purchase, it is intended that the consumer use the carton for storage of the cassette tapes. The package of the present invention is intentionally made of about the same exterior dimensions as the cassette tape, itself, so that it is not unnecessarily bulky and, further, so that it can be easily and conveniently carried about by the consumer.

U.S. Pat. No. 3,682,297 also relates to a cardboard carton for cassette tape cartridges. An interior partition wall extends between the top and bottom panels and provides one of the side walls, along with the exterior side wall, for having a tape cartridge located therebetween. Again, the carton of the '297 patent, similar to that previously described with respect to the '763 patent, intentionally makes the cardboard carton of a greater dimension than the cassette tape in order to prevent theft. Here, too, as with the other device, the cardboard carton is not intended to be reused for storage purposes after the cassette tape is purchased by the consumer from the retailer. This is in contrast to the present invention.

U.S. Pat. No. 3,656,612 also relates to a cardboard carton for cassette tapes and, again, provides a pilfer proof carton of greater dimension than the cassette tape itself. The carton is not intended for subsequent storage purposes after initial purchase but, rather, is of a greater dimensional size than the cassette tape itself in order to reduce the possibility of shoplifting. Again, this is in contrast to the present invention which intentionally provides a cassette tape carton of about the same overall dimensions as the cassette tape, which carton is intended to be reused for convenience and storage purposes. Furthermore, the present invention provides a convenient and separate compartment in the package for location of a book of lyrics, liner notes or other relevant information.

U.S. Pat. No. 4,828,105 relates to a cassette holding card and, as can be best understood by a review of the drawings and description thereof, provides a device which is significantly larger than the cassette tape itself. Basically, a greeting card is provided and comprises a single sheet of cover stock formed into three adjacent panels. A first panel is provided with upper and lower flaps and a side flap and, in addition, a substantially rectangular display panel or aperture. When the device is suitably scored and folded, the cassette tape projects through the display panel and written material can be provided on the interior surfaces of the panels. This device, however, is intentionally made of a greater dimension than the cassette tape, and, again, this is in contrast to the present invention which provides a fully protective package for a cassette tape which can be reused. It can be conveniently placed into a person's pocket and will not be uncomfortably held therein.

U.S. Pat. No. 5,022,522 relates to a book and sound recording holder and is similar to U.S. Pat. No. 4,828,105. Here, again, the overall package is substantially larger than the cassette tape itself. This device shows a book which may correspond to the audio recording on the cassette tape. The book is, itself, of much larger dimension than the cassette tape. The present invention, however, provides for a package for storage of the cassette tape which is about equal to the overall dimensions of the cassette tape and a book of lyrics or other indicia is placed within the boundaries of the tape and within the package.

U.S. Pat. No. 4,457,428 relates to a case for microcassette storage. This device is similar to the currently existing hard plastic cases for standard Norelco cassette tapes, yet it is intended to store cassette tapes of micro size. It shows the hinged-like construction of the hard cases and, according to the patent, it is necessarily made from hard plastic. It suffers from the same disadvantages of the Norelco hard plastic package which the present invention seeks to avoid.

U.S. Pat. No. 2,580,141 relates to a portable book-record holder and is of background interest only to the present invention.

SUMMARY OF THE INVENTION

The present invention is a package for storage of a cassette tape. In the preferred embodiment a small booklet is packed into the package. The booklet may contain either lyrics, liner notes or other information relating to the cassette tape. In its preferred form, the package is constructed from a single sheet of cardstock and visually resembles, when closed, a flip-top package used for cigarettes. The present invention provides a separate compartment within the package for holding and storing a booklet, the compartment in the preferred embodiment being physically separate from the compartment for the cassette tape.

The present invention is ecologically safe in that it is made from recyclable paper material. It is, therefore, a significant advance over the prior art hard plastic Norelco-type cassette packages which do not biodegrade. Furthermore, the present invention is less clumsy to open and close and one can open the same with one hand while the hard plastic packages currently in use are far more complicated to open and close, and, generally speaking, require two hands to do so.

As previously discussed, the written information often contained within the hard plastic case is, generally speaking, printed on a J-card. It is scored and folded so it can be placed within the hard plastic cassette package. It is printed with extremely small type making it difficult to read. It also, rather quickly, becomes loose from the carton and it also tears apart because of the many folds. In contrast, however, the present invention contemplates that a printed booklet of written material, assembled by folding and stapling, can be securely placed within the package. This booklet need not necessarily have such small type and therefore, will be far easier to read. Furthermore the binding as, for example, with staples, will be far sturdier than the J-card written information. The booklet is able to be made into a sturdier, easier to read format because of the separate compartment of the package used to store and hold the booklet.

The present invention basically comprises a single sheet of card stock. It is die cut into four basic sections: a flip-top; a back panel; a dividing panel; and a front panel. The top and other panels are scored to facilitate folding and final assembly. The package is assembled and certain flaps are glued to secure the members in place. As constituted, a parallel piped structure is formed having a first compartment for the cassette tape and a separate, second compartment, overlying the first for a small booklet. A pair of spacing legs, projecting from the booklet-backing or dividing panel, positively space the front panel from the dividing panel. The compartments are closed by a single flip top. The product is configured so that loading of cassette product and booklet and/or merchandise can easily occur from the bottom of the package. Thus it is far easier to assemble and load both manually and with automatic machine than prior art packages.

For a better understanding of the present invention, together with other and further objects thereof, reference is made to the following description taken in connection with the accompanying set of Figures.

Figure 1:
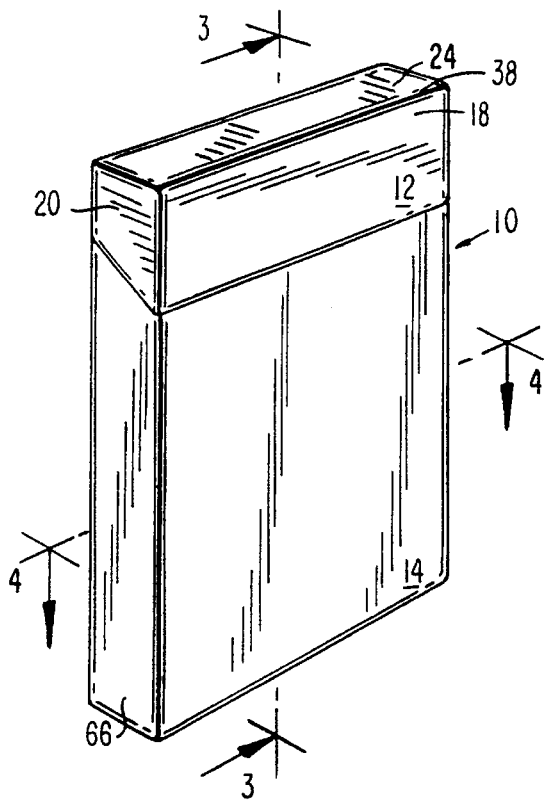
FIG. 1 is a perspective view of an assembled and closed package made in accordance with the present invention. A cassette tape and a booklet of related information as contained within the package.
Figure 3:
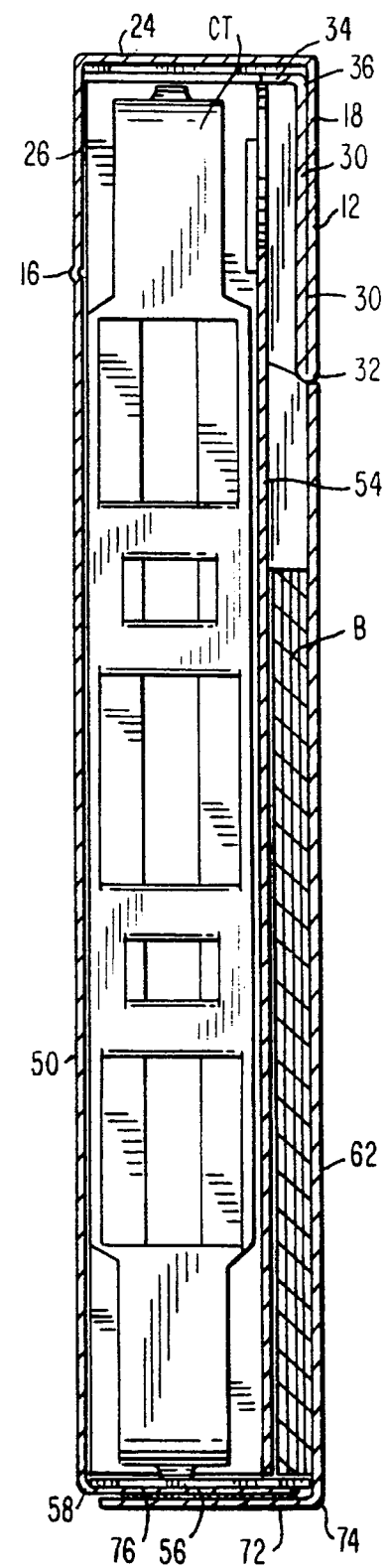
FIG. 3 is a cross-sectional view taken along lines 3—3 of FIG. 1.

DETAILED DESCRIPTION OF THE DRAWINGS AND THE PREFERRED EMBODIMENT OF THE CURRENT INVENTION

As best seen in the drawings, a package 10 is made from a single and originally flat sheet of card stock material. When scored, folded, glued and assembled, it is designed to contain and enclose a cassette tape of standard configuration, CT, and in addition, a small booklet of information B, as for example, a libretto of lyrics to the songs contained on the cassette tape. The booklet B is contained in a separate compartment from that which contains the cassette tape CT. The package 10 containing the cassette tape CT and the booklet B can be safety sealed for consumer purchase. After purchase, the shrink wrap plastic can be easily removed and discarded, leaving the package for subsequent use and reuse. A flip-top 12 is hingedly connected to the container portion 14 of the package by a fold line 16. The fold line 16 forms the hinge connecting the flip top 12 and the container portion 14. In this manner, the flip top 12 can be repeatedly opened and closed so as to allow the cassette tape CT and/or booklet B to be selectively removed or stored in the container portion 14.

The flip top 12 consists of front panel 18, a top panel 24 and a rear panel 26 separated by fold lines 38 and 28, respectively. Trapezoidal shaped side walls 20 and 22 extend outwardly from front panel 18 and are separated therefrom by fold lines 45 and 47, respectively. Top panel 24 extends from back panel 26 of the flip top 12 and is separated therefrom by fold line 28. An inside front panel 30 extends from front panel 18 and is separated thereby by fold line 32, while inside top panel 34 extends from inside front panel 30 and is separated thereby by fold line 36. Inside top panel and inside front panel provide structural rigidity to the flip-top and facilitate holding the top in the closed position unless deliberately opened. Front panel 18 is separated from the top panel 24 by fold line 38.

Figure 5:
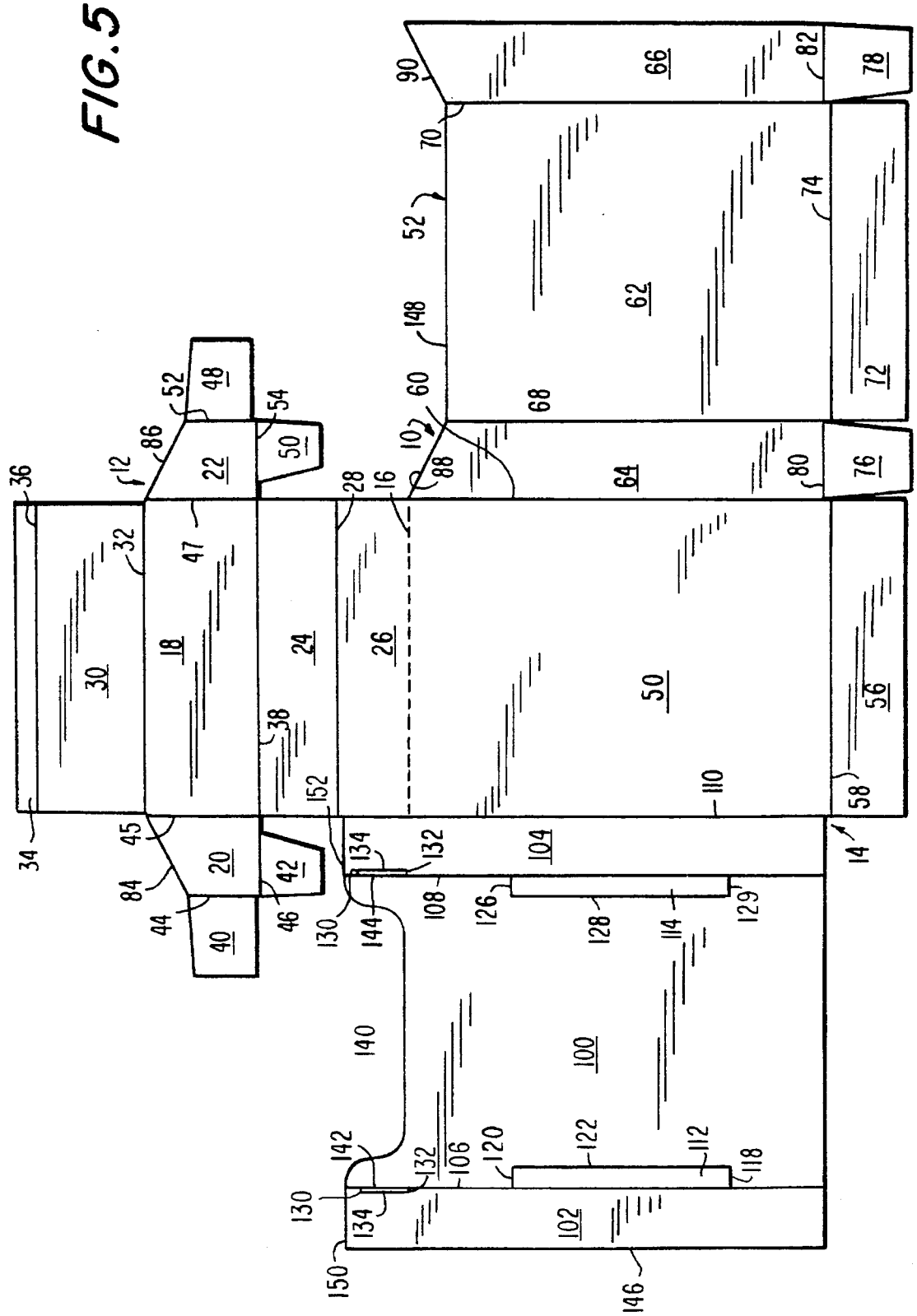
FIG. 5 is a top plan view of the die cut and scored blank of card stock, prior to assembly, which forms the package of the present invention.

Gluing flaps 40 and 42 (see FIG. 5) extend from side wall 20 and are separated therefrom by fold lines 44 and 46, respectively, while glue flaps 48 and 50 extend from side wall 22 and are separated therefrom by fold lines 52 and 54.

The container portion basically comprises three panels: back panel 50, front panel 52, and booklet-backing panel or dividing panel member 54. Back panel 50 is hingedly connected to the flip-top 12 by hinge 16. A first bottom flap 56 extends from back panel 50 and is separated therefrom by fold line 58.

Front panel 52 is separated from back panel 50 by fold line 60. Front panel 52 basically comprises front cover panel 62 and exterior sides 64 and 66 which are separated from front cover panel 62 by fold lines 68 and 70, respectively.

Extending downwardly from front cover panel 62 is a second bottom flap 72, separated from front cover panel 62 by fold line 74. Similarly, extending downwardly from side panels 64 and 66, are bottom glue flaps 76 and 78, respectively, separated from their respective side panels 64 and 66 by fold lines 80 and 82. Bottom gluing flaps 76 and 78 are tapered away from the side panels so that when the container portion 14 is folded, as will be explained, they will easily fit within the bottom of the container portion and can be easily glued to the second bottom flap 72 or 56, whichever is folded in first. Exterior side walls 64 and 66, at their upper ends, are upwardly inclined away from front cover panel 62. Their angle of inclination matches the angle provided by the trapezoidal shaped sidewalls 20 and 22 (edges 84 and 86) so that the flip top 12, when closed, has edges 84 and S6 of sidewalls 20 and 22, abutting against edges 88 and 90 of exterior sidewalls 64 and 66. The edge of the front panel 18 corresponds to fold line 32 and will abut against edge 148 of front cover panel 62. This can best be seen in FIG. 1.

Dividing panel member 54 serves as an interior partition of container portion 14 and divides the container portion 14 into a first compartment for holding the cassette tape CT and a second compartment for storage of a booklet B. Dividing panel member 54 extends laterally from back panel 30 and is separated therefrom by fold line 110. Dividing panel member 54 comprises dividing panel 100 and two inside side panels 102 and 104 extending laterally from dividing panel 100 and separated therefrom by folding lines 106 and 108, respectively. In an alternate embodiment, dividing panel 100 may merely comprise inwardly extending ridges for holding or supporting two edges of the booklet. Inside side panel 104 is attached to back panel 50 by fold line 110. Forwardly projecting spacing legs 112 and 114 are formed from dividing panel 100. Cuts 118 and 120 and long cut 122 define forwardly projecting spacing leg 112. Cuts 124 and 126 and long cut 128 define forwardly projecting spacing leg 114. Spacing legs 112 and 114 are projections from inside side panels 102 and 104, respectively, being connected thereto by fold lines 106 and 108, respectively.

Figure 2:
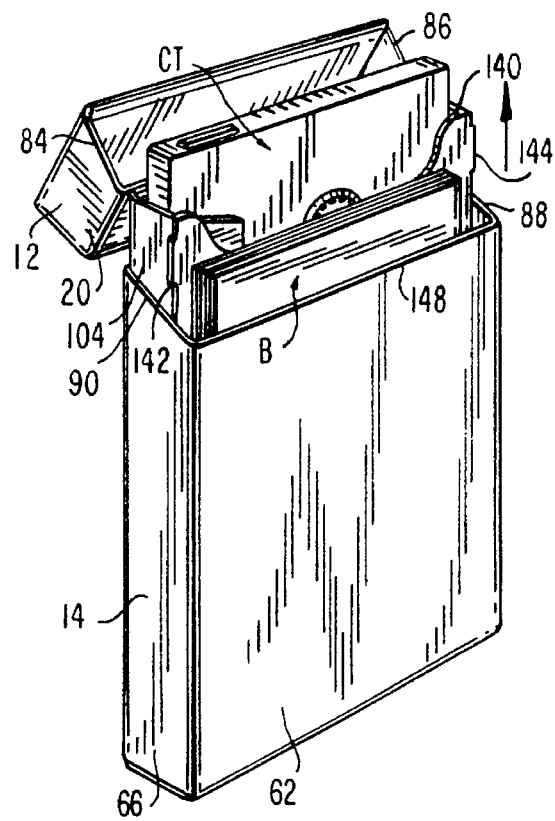
FIG. 2 is a perspective view, similar to that shown in FIG. 1, yet showing the fliptop in an open position and the cassette tape and booklet held in their respective compartments.
Figure 4:
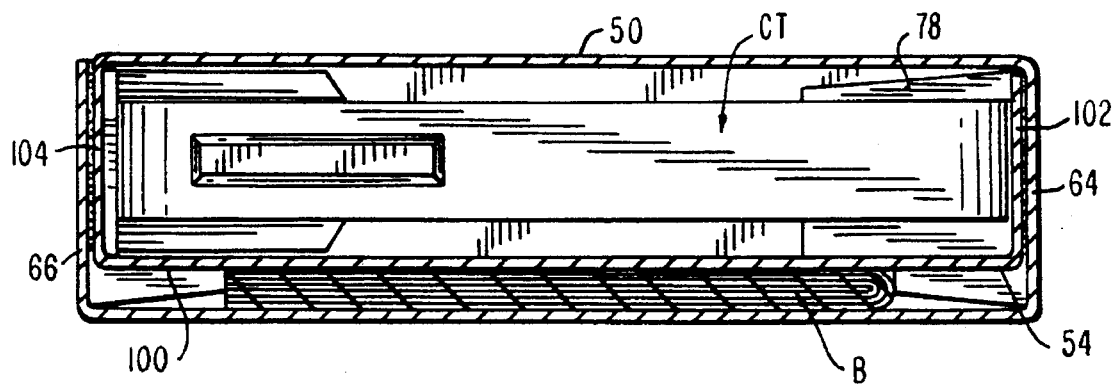
FIG. 4 is another cross-sectional view, this one taken along lines 4—4 of FIG. 1.

When assembled, as will be further discussed, the spacing legs 112 and 114 positively space and locate front panel member 52 above dividing panel 100 so that the booklet B can be easily inserted and removed therefrom. Forwardly projecting spacing legs 112 and 114 provide two rest surfaces for front panel 62. Cuts 130 and 132 and small cut 134 are provided to inside side panels 102 and 104. These cuts define holding tabs which frictionally engage the inside surface of the flip top to keep it closed unless manually opened. The holding tabs 142 and 144 are connected to dividing panel 100 by fold lines 106 and 108 and project laterally outward from dividing panel 100 (See FIG. 2).

A curved front edge 140 is provided to dividing panel 100 to facilitate the removal of the cassette tape CT when it is inserted into its appropriate compartment. Edges 150 and 152 of side panels 102 and 104, respectively, along with the uppermost portions of curved front edge 140 frictionally engage and hold the flip-top closed unless manually opened. Those surface edges are held between the inside top and inside front panels 34 and 30, respectively, and side walls or panels 20 and 22.

When cuts 118, 120 and long cut 122 are made as well as cuts 124,126 and long cut 128, and after inside side panels 102 and 104 are folded backwardly with respect to dividing panel 100, along fold lines 106 and 108, respectively, the forwardly projecting spacing legs 112 and 114 project above the plane defined by the dividing panel 100 and serve to space and distance front panel 62 from the dividing panel 100. This spacing serves to allow the booklet B to be easily inserted into and selectively removed from its front or forwardly located compartment.

Similarly, when cuts 130, 132 and short cut 134 on inside side panel 102 and 104 are made, the holding tabs 142 and 144 will touch and frictionally grip the inside of the side walls 20 and 22 of the flip top 12.

The assembly of a package 10 from a single sheet of die-cut cardstock will now be described. The package 10 is first die cut from the single sheet of cardstock, with the excess removed and discarded. Then, all fold lines are scored and all cut lines 118, 120, 122, 124, 126, 128, 130, 132 and 134 are slit. The package 10 in its flat form, i.e., prior to assembly, should resemble that shown in FIG. 5. Then, keeping back panel 50, flat, against a working surface, the dividing panel 100 is folded over, about fold line 110, so that inside side panels 102 and 104 extend at right angles, between back panel 50 and dividing panel 100. Edge 146 of inside panel 102 should be just inside and basically aligned with fold line 60. A first compartment is thus formed by side panels 102 and 104, back panel 50 and dividing panel 100. This compartment holds the cassette tape CT.

As mentioned, forwardly projecting spacing legs 112 and 114 extend above the planar surface of dividing panel 100, while lateral projecting spacing legs 142 and 144 will project laterally beyond inside side panels 102 and 104, respectively. The inside side panels 102 and 104 are, of course, held at right angles to both back panel 50 and dividing panel 100 and held in place until cover panel 62 is folded thereover. Inside side panel 102 is folded about fold line 106 and held at right angles to dividing panel 100 while inside side panel 104 is bent and held at right angles to both dividing panel 100 and back panel 50, by fold lines 108 and 110, respectively.

Front panel 52 is then folded over dividing panel 100 so that front cover panel 62 overlays and is spaced above by forwardly projecting spacing legs 112 and 114, dividing panel 100. Exterior side panel 64 overlays inside side panel 102 and together form a very sturdy structure. Side panel 66 overlays and is glued to the outside of inside side panel 104 and, also, provides structural rigidity. Gluing flaps 76 and 78 are folded up about fold lines 80 and 82. Second bottom flap 72 is folded up about fold line 74. It will be appreciated that exterior side 64 is folded about fold lines 60 and 68 and locates front panel 52 and front panel cover 62 above back panel 50 and dividing panel 100. Thus, the width of exterior side panels 64 and 66 is, of course, larger than the width of inside side panels 102 and 104 and is about equal to the dimension extending between edge 146 of inside side panel 102 to long cut 122 which, of course, is about equal to the same dimension extending between fold line 110 and long cut 128. Exterior side panel 64 will directly lie on inside side panel 102 while exterior side panel 66 will be substantially flush against the outside of inside side panel 104. Exterior side 66 is glued against the outside of inside side panel 104. Inside side panel 102 may also be glued to the inside of exterior side 64. Glue flaps 76 and 78, when turned inwardly, are intended to be glued to either bottom flap 56 or to second bottom flap 72 and, with front cover 62 superimposed over dividing panel 100, the bottom flap 56 is bent about fold line 58 so that it, too, can be glued directly to second bottom flap 72.

It should be appreciated that folding the container portion 14 and gluing the flaps, as described, will result in a container portion 14 having two compartments, one for holding a cassette tape CT and another for holding a booklet B. The construction resembles that of a flip-top cigarette package and, yet, two compartments are formed, with the first compartment being separated from the second compartment by the dividing panel. The separation is primarily maintained by the forwardly projecting spacing legs 112 and 114.

With the container portion thus formed, the flip-top 12 should be folded, glued and assembled. First, the flip-top 12 is folded about fold lines 28, 32, 36, 38, 44, 45, 46, 47, 52 and 54, and, in addition, about hinge 16. Trapezoidal shaped side walls 20 and 22 are bent, at right angles to front panel 18 about fold lines 45 and 47, respectively. Glue flaps 40 and 42 are then folded such that glue flap 40 is secured against back panel 26 with glue flap 42 secured against top panel 24. Similarly, glue flap 50 is secured against top panel 24 with glue flap 48 held against back panel 26. The inside front 30 is bent about fold line 32 and is placed substantially coplanar and inside front panel 18. Inside top 24 is held against the inside surface of top panel 24. inside front 30 and inside top 34 can, if desired, be glued against front panel 18 and top panel 24, respectively, if desired.

When the flip top 12 is assembled as described and the container portion 14 is also properly assembled, a package 10 is provided with two compartments, one for a cassette tape CT, another for a booklet B. A flip-top 12 provides access and a closure to the two compartments. Edges 84 and 86 of the flip-top 12 will mate and abut against edges 88 and 90 of exterior sides 64 and 66, while fold line or edge 32 of flip-top 12 will mate and abut against edge 148 of front cover panel 62. In addition, outwardly projecting tabs 142 and 144 will frictionally engage and hold the flip-top 12 in its closed position unless manually opened since the tabs will abut against the side walls 20 and 22. As mentioned, the flip-top 12 is hingedly connected to the container portion 14 and is adapted to open and close by rotating about hinge or score line 16.

This invention has been described with a preferred embodiment, but other variations of the invention will be apparent to those of ordinary skill in the art without departing from the scope of the invention that is set forth in the appended claims.

I claim as follows:

1. In combination, a data encoded storage device and a cardboard container for holding said data encoded storage device, said storage device carried in a compartment in said cardboard container, said cardboard container substantially resembling a flip-top cigarette box, but having dimensions slightly larger than said storage device to achieve a snug fit for said storage device, said cardboard container comprising:
   a. a flip top closure and a container portion;
   b. said container portion having front, rear, bottom and side walls fixedly secured together;
   c. said flip top closure closing said cardboard container when moved toward said container portion,
   d. said container portion having a rear side, said flip top closure hingedly joined to said container portion along a fold line in said rear side,
   e. said flip top closure comprising a front panel, a rear panel, a top panel and side walls;
   f. said side walls and said front panel of said flip top closure being aligned with the side walls and said front wall, respectively, of said container portion when said flip top closure is closed;

said cardboard container being sufficiently rugged to maintain its shape when the storage device is removed therefrom, and said cardboard container comprising printable surfaces capable of accepting graphic and display material thereon to be correlated with the identity of the specific storage device carried therein.

2. A storage device and cardboard container combination according to claim 1, wherein said cardboard container has a height and width, with said height greater than said width to form a rectangular shape, wherein a front compartment is provided for printed material and extends across the width of said cardboard container and is formed within said cardboard container, said front compartment being less thick than said compartment for said storage device.

3. A storage device and cardboard container combination according to claim 2, wherein the top of the data encoded storage device housed in said compartment for said storage device is above the top of the printed material when printed material is inserted in said front compartment.

4. A storage device and cardboard container combination according to claim 1 wherein said storage device comprises a standard cassette tape.

5. A storage device and cardboard container combination according to claim 1 wherein said storage device comprises a compact disc.

6. A storage device and cardboard container combination according to claim 1 wherein said storage device comprises a minidisc.

7. A storage device and cardboard container combination according to claim 1 wherein said storage device comprises an audio cassette tape of the DAT type.

* * * * *